Sept. 13, 1960 A. SAFFERLING 2,952,806
METHOD OF AND DEVICE FOR CARRYING OUT
NONDESTRUCTIVE HARDNESS TESTS
Filed Aug. 27, 1956
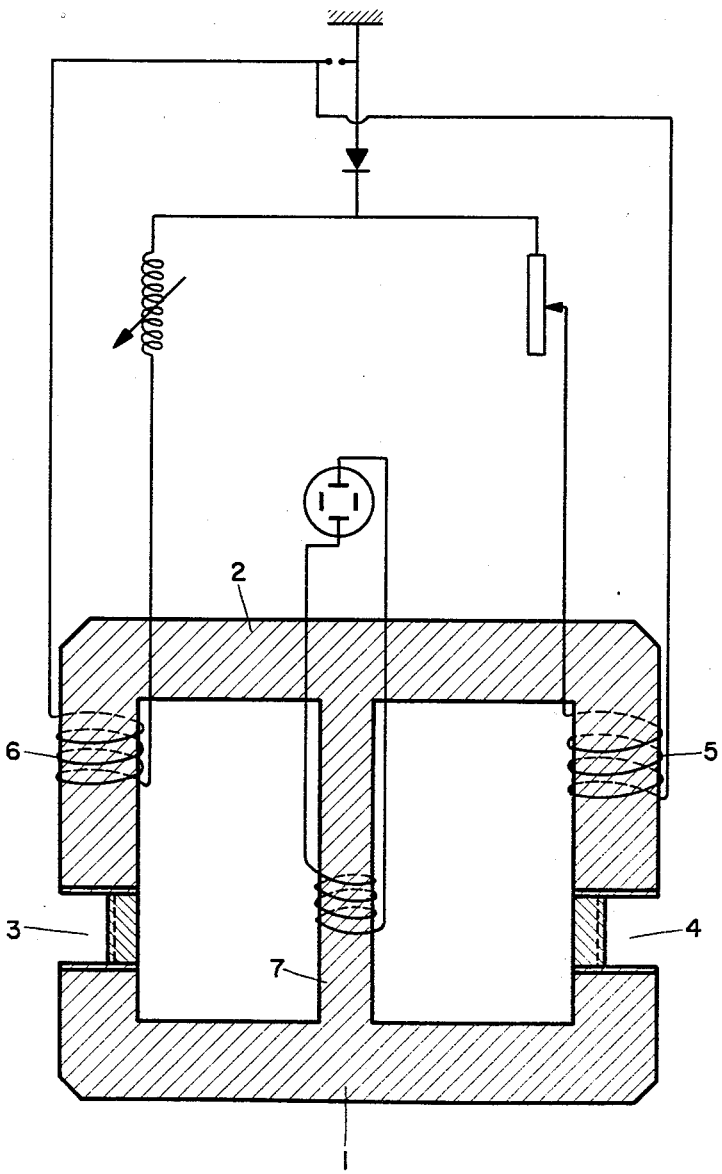

United States Patent Office 2,952,806
Patented Sept. 13, 1960

2,952,806

METHOD OF AND DEVICE FOR CARRYING OUT NONDESTRUCTIVE HARDNESS TESTS

Anton Safferling, Schweinfurt, Germany, assignor to Kugelfischer Georg Schäfer & Co., Schweinfurt, Germany Filed Aug. 27, 1956, Ser. No. 606,475

Claims priority, application Germany Sept. 1, 1955

2 Claims. (Cl. 324—34)

It has been known to those skilled in the art that steel derives its hardness from the formation of martensite during quenching. Since martensite has a considerably higher remanent magnetism than pearlite, a known method makes use of this phenomenon by measuring the remanence of the residual magnetism. The measured value is then considered to be a measure of the martensite content and thus the hardness of the steel.

However, only if the member or body under test does not contain any residual austenite is it possible reliably to determine the hardness of steel by measuring its remanence. It should be understood that the residual austenite has the characteristic property of reducing the magnetic saturation of the material and thus—according to the law followed by the saturation curve—the remanence. It should be further understood that such residual austenite will always be found in any hardened part in varying amounts, this being due to the fact that even very small changes in the heat treatment and/or in the composition of the material will give rise to the formation of residual austenite, it being impossible in practice completely to avoid such changes or variations. Therefore, in the presence of residual austenite in the member under test, the known method of exclusively measuring the remanence will indicate a slight remanence, from which fact the conclusion is drawn that the hardness of the member under test is insufficient, whereas actually the hardness is satisfactory. This leads to the erroneous scrapping of some of the members or parts under test.

Further errors arise from the use of the known method of only measuring the remanence of magnetism in cases in which the body under test contains troostite. Troostite, while reducing the remanence or retentivity in a much smaller measure than a similar amount of austenite, also tends to decrease the hardness. Despite the fact that the actual hardness of a member having a high martensite content and a low residual austenite content differs from that of a part having a low martensite content and a higher troostite content, the said known method will therefore give identical remanence values which lead to erroneous conclusions regarding the hardness of the steel.

There have also been known certain methods by means of which it is attempted to determine the hardness of steel by measuring the magnetic saturation. However, for the same reasons as those discussed above these methods fail to give reliable results, this being due to the very fact that the best qualified parts having a martensite content and a low residual austenite content exhibit the same saturation as the unhardened parts. Therefore, such parts are erroneously eliminated as being too soft.

The present invention now eliminates the aforementioned drawbacks of heretofore known methods by providing a method of carrying out nondestructive hardness tests, which method of the invention is characterized by the fact that a given part under test is placed in a magnetic circuit together with a master part which has a maximum residual austenite content, that both the saturation and the remanence are measured, and that the difference between these two values is used to determine the relative proportions of hard structure and of hardening carbon in solution. Furthermore, the method of the invention makes it possible to determine the amount of martensite independently of the residual austenite content. Moreover, it is possible to determine the amount of residual austenite and pearlite in the part under test. It will, therefore, be appreciated that the method of the present invention provides for very accurate results of hardness tests performed according to the invention and that heat-treated parts can thus be checked with absolute certainty.

In addition the present invention is concerned with a device adapted to carry into practice the aforementioned testing method. The said device is characterized by the provision of a U-shaped soft-iron core with two magnetizing coils and a soft-iron yoke member, which members are centrally interconnected by a soft-iron bridge member, there being provided at the ends of the limbs of the U-shaped core two accurately predetermined identical air gaps. Using this device in combination with the method of the invention, it is possible accurately to measure the difference between saturation and remanence.

These and other objectives and advantages of the invention will be apparent during the course of the following specification, when read in connection with the accompanying drawing which illustrates a preferred embodiment of a device according to the invention.

The device which is adapted to carry into practice the method of the invention of performing nondestructive hardness tests resembles a transformer. It comprises a substantially U-shaped soft-iron core 2 and a soft-iron yoke 1. These two portions or members are centrally interconnected by a soft-iron bridge portion 7. Provided between each end of the soft-iron yoke 1 and the adjacent end of the respective limb of the core 2 is an air gap; these air gaps which are designated by the reference numerals 3 and 4 are accurately predetermined and of identical design. Each of the vertical outer limbs of the U-shaped soft-iron core carries a magnetizing coil 5, 6. Connected to the soft-iron bridge 7 is a magnetic flux measuring instrument. For the purpose of performing a test there is placed into one of the said air gaps 3, 4 a master part or work piece, while the part under test is placed into the other of the two air gaps, suitable stops being provided to keep the master part and the part under test in an accurately predetermined position, it being understood that the said parts are of identical shape.

Energizing the magnetizing coils 5 and 6 with a pulsating direct current or a rectified alternating current will set up in the air gaps 3, 4 a magnetic field the strength of which will constantly fluctuate between zero and the saturation field strength, the direction of said field being, however, maintained the same. The lines of magnetic force will subtract within the soft-iron bridge 7. Assuming that the two parts that have been placed in the air gaps differ in their structure, this difference will be due to either their remanence only, or their saturation only, or both of these magnetic properties. The magnetic flux within the soft-iron bridge will then be maximally proportional to the difference in saturation between the two parts or work pieces and minimally proportional to the difference in remanence between the two parts. If the master or reference part be so selected as to contain, in addition to martensite, an extremely high proportion of residual austenite but no ferrite, the magnetic flux in the soft-iron bridge will be a measure of the relative proportions of martensite and ferrite present in the part under test in the event there is no complete hard structure. However, when the part under test has been fully hardened, the magnetic flux in the soft-iron bridge is a measure of the relative proportions of martensite and residual austenite. It is thus possible in every case to determine the amount of hard structure in the part under test, experience having shown a very satisfactory agreement between the results of tests of the nature just described and the results of mechanical hardness tests.

I claim:

1. A method of nondestructive testing of ferro-magnetic working material by determining its magnetic properties; comprising the steps of placing a test piece together with a standard piece in a pulsating magnetic circuit, the strength of which will constantly fluctuate only between zero and the saturation field strength, the direction of said field through said pieces being however maintained the same, whereby a magnetic flux is excited in the pieces, the strength of which is equal to the difference of the saturation between said standard piece and said test piece when energizing the magnetic field in sufficient degree to saturate the two pieces and then reducing to zero, whereby the strength of said magnetic flux is equal to the difference of the remanence of said pieces, combining said two fluxes, whereby a magnetic flux is excited, the strength of which is equal to the difference between said difference of the saturation and said difference of the remanence of said two pieces, and measuring said strength.

2. A method of nondestructive testing of ferro-magnetic working material by determining its magnetic properties, comprising the steps of placing a test piece together with a standard piece having a maximum residual austenite content at two different places of one and the same magnetic field, exciting the field by a magnetizing current which periodically rises from zero to a maximum value and then drops again, so that the test and standard piece are magnetized by this external field, and while the external field varies periodically back and forth between zero and the maximum value, the magnetization of the test and standard piece caused by the external field varies back and forth between remanence and saturation, combining the magnetic flux of the pieces, measuring the strength of the combined excited magnetic flux which will be maximally proportional to the difference in saturation between the two pieces and minimally proportional to the difference in remanence between the two pieces.

References Cited in the file of this patent

UNITED STATES PATENTS

| | | |
|---|---|---|
| 890,085 | McCann et al. | June 9, 1908 |
| 1,223,377 | Fahy | Apr. 24, 1917 |
| 1,682,435 | Spooner | Aug. 28, 1928 |
| 1,966,984 | Litchenberger et al. | July 17, 1934 |
| 2,269,152 | Hathaway | Jan. 6, 1942 |
| 2,440,984 | Summers | May 4, 1948 |

FOREIGN PATENTS

| | | |
|---|---|---|
| 716,410 | France | Oct. 6, 1931 |
| 599,912 | Great Britain | Mar. 24, 1948 |